UNITED STATES PATENT OFFICE.

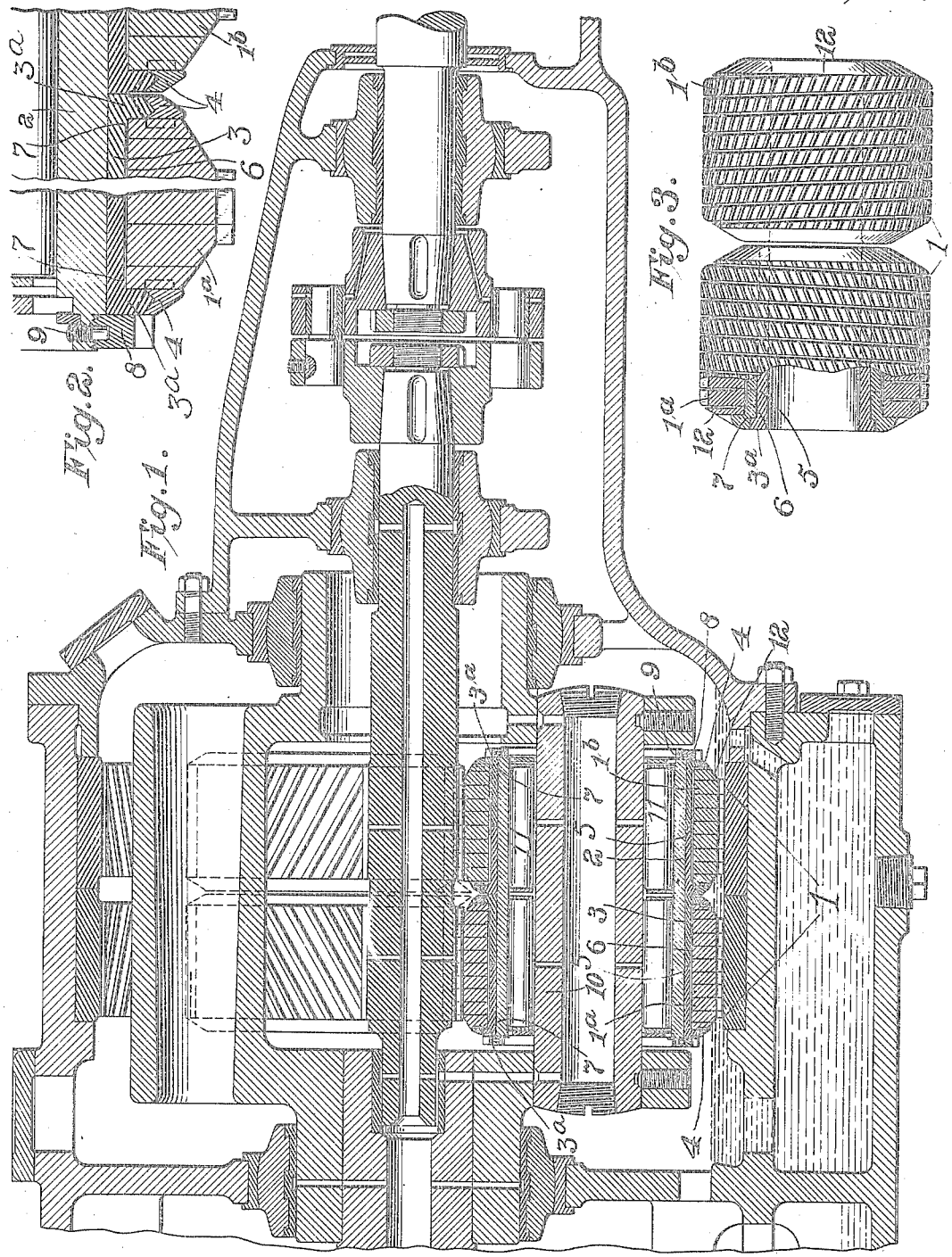

GUSTAVE FAST, OF MOUNT WASHINGTON, MARYLAND, ASSIGNOR OF TWENTY-FIVE PER CENT. TO CURRAN W. HARVEY AND TEN PER CENT. TO F. BARTON HARVEY.

RESILIENT GEAR.

1,399,549.   Specification of Letters Patent.   Patented Dec. 6, 1921.

Application filed March 11, 1918, Serial No. 221,763. Renewed May 5, 1921. Serial No. 467,125.

*To all whom it may concern:*

Be it known that I, GUSTAVE FAST, a citizen of the United States, a resident of Mount Washington, in the State of Maryland, have invented certain new and useful Improvements in Resilient Gears, of which the following is a specification.

This invention includes a planetary helical gear in a power transmission system between a center pinion and a toothed annulus which will automatically compensate for irregularities in the teeth of said parts.

The invention is shown in connection with an internal helical gear power transmission apparatus such as is disclosed in Letters Patent of the United States, granted to me February 27, 1917, No. 1,217,427.

The invention is shown in the accompanying drawings in which—

Figure 1 is a central vertical sectional view of a power transmission apparatus including my invention.

Fig. 2 is a detail view of a portion of the coiled strip, showing its relation to the sleeve to which it is attached and to other parts with which it is associated.

Fig. 3 is a side view of the compensating gear elements with a part broken away and in section.

The planetary or transmission gear member 1 comprises strips 1ᵃ 1ᵇ wound spirally in opposite directions about a body or carrier member 2 of cylindrical form, one strip, as shown in Fig. 2, being cut with teeth inclining in one direction and the other strip being cut with teeth inclining in the other direction to make the herring bone formation. Each strip is preferably deeper than wide, and is wound helically and edgewise upon a sleeve 3 which is flanged at each end as at 3ᵃ. One end of each strip is welded to one flange of its sleeve and the other end of the strip is welded to the other flange of the sleeve, the welded joint being shown at 4, but the intermediate convolutions of the helical strip are not attached either to the sleeve or each other. The sleeve of each coil or helical winding is divided intermediate of its length at 5, the line of division being transverse to the axis. There is a clearness as shown at 6 between the inner surface of the convolutions and the sleeve belonging thereto excepting at the end convolutions which find bearings partly upon the shoulders 7 on the sleeve.

The sleeves are secured to the body 2 of the gear by ring nuts 8 screw threaded onto reduced ends of the main body, see Fig. 2, and held by set screws 9.

The planetaries are mounted to turn on spindles 10 and any suitable form of bearing may be provided, but I have shown a roller bearing 11, in Fig. 1.

The teeth are not cut throughout the entire convolutions, but, as shown, the end convolutions 12 are cut away without teeth, and the second convolutions are partly minus the teeth.

In action the convolutions can yield circumferentially to accommodate irregularities in the intermeshing teeth and the clearance above mentioned is sufficient to provide for the widest range of imperfections that will be encountered, with full yielding or compensating action, being still free from bearing on the sleeve.

This construction of planetary gears will take care of irregularities due to inaccurate spacing of the spindles on which the planetaries are mounted. It will be noticed that both sections of each of the sleeves 3 are free to turn on the carriers 2, and the compensating effect can be initiated at any point in either of the convolutions making up the herring bone gear.

I claim as my invention—

1. A power transmission gear consisting of a helical strip yieldable in the circumferential direction of its convolutions, the ends of the strip being relatively movable, said convolutions having teeth extending across them, substantially as described.

2. A power transmission gear consisting of a helical strip yieldable in the circumferential direction of its convolutions, said convolutions having teeth extending across them, and carrier means to which the ends of the strip are attached, the carrier means at the ends of the strip being capable of relative rotary movement, substantially as described.

3. A power transmission gear consisting of a helical strip yieldable in the circumferential direction of its convolutions, said convolutions having teeth extending across them and a sleeve within the helical strip, said sleeve being split intermediate of its length and having its ends attached to adjacent ends of the strip, substantially as described.

4. A helical gear comprising a pair of helical strips arranged coaxially, said strips being each yieldable circumferentially of its convolutions, and teeth extending across the said strips, the teeth of one strip being at opposite inclination from those of the other strip, substantially as described.

5. A helical gear comprising a pair of helical strips arranged end to end, a sleeve within each strip, split intermediate of its length and having its sections connected to the ends of the helical strip belonging thereto, a carrier on which the sleeve sections are mounted and free to turn, and means for holding the sleeves on the carrier against axial displacement, substantially as described.

6. As an article of manufacture, a spiral resilient member having teeth in the convolutions thereof to form a gear.

7. As an article of manufacture an integral gear structure each tooth of which is composed of a plurality of resilient sections arranged side by side along said tooth, substantially as described.

8. As an article of manufacture an integral gear structure of cylindrical form, each tooth of which extends from end to end of the gear and is composed of plurality of resilient sections.

9. As an article of manufacture a hollow member composed of a strip wound spirally to form the resilient member and gear teeth formed on the periphery of the convolutions of the resilient member, substantially as described.

10. A gear structure comprising a hollow member having spiral convolutions on which are formed gear teeth, the hollow member having some of its convolutions positively connected to means on which the gear is mounted.

11. A gear structure comprising a hollow member having spiral convolutions on which are formed gear teeth, carrier means to which the ends of the spiral are connected, the portions of the convolutions intermediate the said connected ends being free from connection with the carrier means and yieldable, substantially as described.

12. A gear structure comprising a spiral member having inherent resilience, and provided with gear teeth extending transversely of the convolutions, carrier means to which the ends of the spiral member are connected the convolutions intermediate the said connected ends lying opposite but spaced apart from the said carrier means and yieldable, substantially as described.

13. A gear comprising a pair of spiral strips arranged coaxially, and with the convolutions of one running in opposite direction from the convolutions of the other, said convolutions having teeth extending across them, the teeth of one strip being at opposite inclination from that of the teeth of the other strip, substantially as described.

14. In combination, a spiral resilient strip having gear teeth extending across its convolutions and means at each end of the strip to which said ends are connected for controlling the movements of said ends in a path concentric with the axis of the gear, substantially as described.

In testimony whereof, I affix my signature.

GUSTAVE FAST.